C. WURSTER.
MACHINE FOR KNEADING AND GRINDING PAPER MAKING MATERIALS.
APPLICATION FILED OCT. 4, 1909.
958,901.
Patented May 24, 1910.
2 SHEETS—SHEET 2.
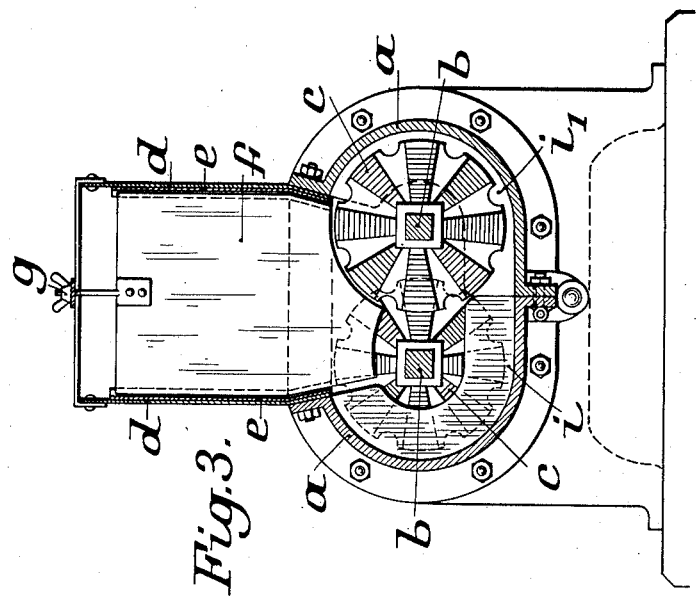
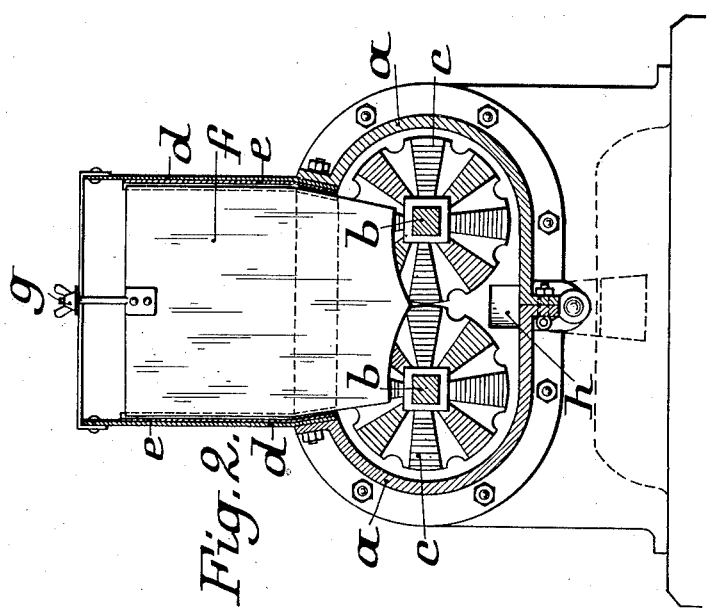
WITNESSES
W. H. Alexander
L. L. Mead.
INVENTOR
Casimir Wurster
BY ATTORNEYS
Fowler & Huffman

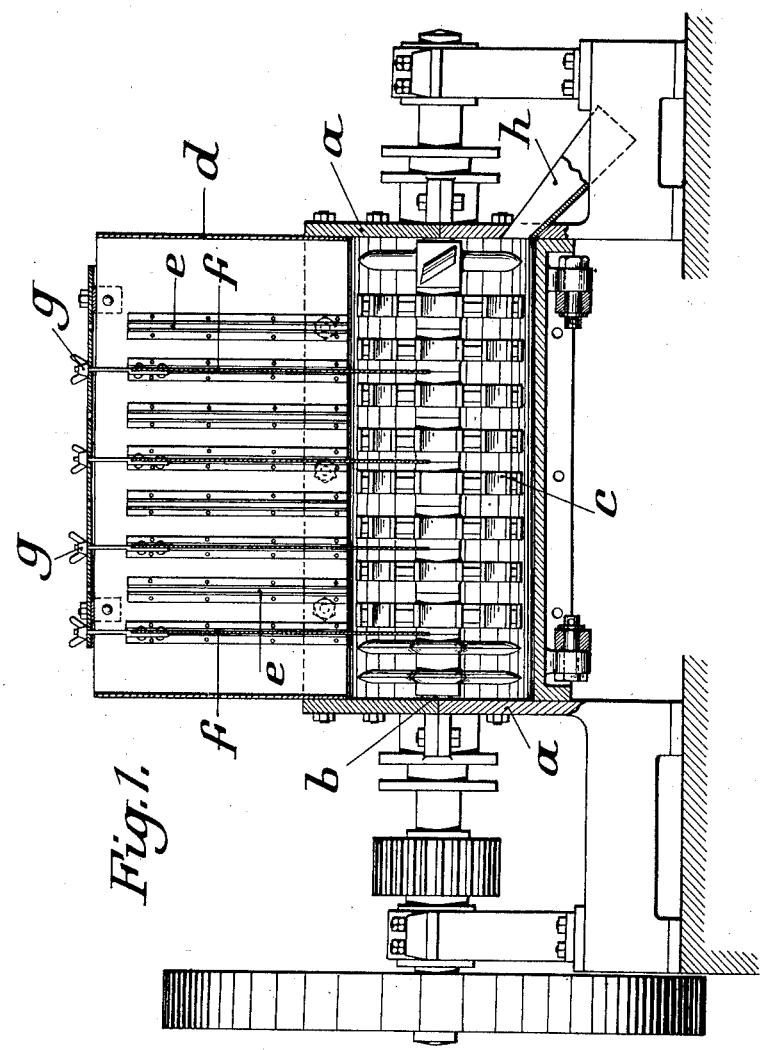

UNITED STATES PATENT OFFICE.

CASIMIR WURSTER, OF BERLIN, GERMANY.

MACHINE FOR KNEADING AND GRINDING PAPER-MAKING MATERIALS.

958,901.    Specification of Letters Patent.    Patented May 24, 1910.

Application filed October 4, 1909. Serial No. 520,892.

*To all whom it may concern:*

Be it known that I, CASIMIR WURSTER, chemist, a subject of the German Emperor, residing at 130 Chausseestrasse, Berlin, Germany, have invented certain new and useful Improvements in Machines for Kneading and Grinding Paper-Making Materials; and I do hereby declare the following to be a full, clear, and exact description of the invention, such as will enable others skilled in the art to which it appertains to make and use the same.

The present invention relates to a machine for kneading and grinding paper-making materials in which one or more shafts provided with kneading-propellers or grinding disks revolve in a trough.

My invention has for its object to remove certain defects in the working of machines of the abovesaid kind more especially to obviate the caking of the material in the kneading trough and thereby to diminish the friction between the kneading or grinding parts and the consequent heating of these parts. This is done by using an open kneading trough in which partitions are arranged to prevent the material from being thrown toward the outlet too soon, before it is sufficiently broken up. These partitions may be made movable and adjustable if desired.

In the accompanying drawings two modifications of the machine according to my invention are shown.

Figure 1 is a longitudinal section through a machine provided with retaining partitions. Fig. 2 is a cross section of the same. Fig. 3 shows a modification of the machine in which the kneading disks overlap and alternating ribs are arranged in the trough between each pair of disks.

In the modification shown in Figs. 1 and 2, $b$ $b$ are two shafts adapted to rotate in a trough $a$. Kneading or grinding parts $c$ are fixed on the shafts $b$, said parts having the form of disks provided with projections. The trough $a$ is open at the top along its whole length and carries an extension $d$ in which the partition gates $f$ are arranged. The partition gates $f$ are movable in guiding slots $e$ and reach down fairly between the kneading disks. The partition gates are made vertically adjustable by screw bolts $g$ provided with thumbnuts and reaching through transverse bars arranged on the extension $d$ of the trough. The partition gates may also be made laterally adjustable. This is done in the present case by providing two or more adjacent guiding slots $e$ for each partition.

In the modification shown in Fig. 3 the grinding disks or kneading propellers $c$ fixed on the shafts $b$, $b$ overlap, and the lower edges of the partitions $f$ are therefore cut away alternately. On the sides of the trough ribs $i$ and $i'$ are arranged alternately, so as to form partitions between each pair of propellers in continuation of the movable partition gates arranged in the upper extension of the trough. Each rib surrounds only one shaft and leaves the other free. Similar ribs have been heretofore employed in machines of this kind, they have however proved especially useful in combination with the above described movable partitions and an open trough in preventing the material from being moved forward toward the outlet too quickly.

In the machines hitherto used for kneading or grinding the paper-making material, closed troughs had to be employed for the reason that in troughs open at the top the material was not subjected long enough or completely enough to the action of the kneading or grinding parts. Larger pieces of paper or lumps of material being heavier were thrown toward the outlet sooner than the completely kneaded or ground up material with the result that the pulp contained larger pieces of uncleared material, and was not fit for use in the vats. In closed troughs however the friction of the kneading parts is liable to become very high especially whenever the material is drier than usual. The pulped up material then cakes strongly together, especially in the back part of the machine, and thereby produces increased friction of the grinding parts and consequent heating and consumption of power by the machine. Rags and pieces of string and the like impurities which are contained in considerable quantity in the so called sorted wastepaper also helped to increase the resistance of the material in the machines hitherto used as they clogged the grinding parts and could only be removed by frequent opening and thorough cleaning of the machine. These defects of the older constructions are obviated by the present invention. Owing to the arrangement of retaining partitions the trough may be made open along the whole or part of its length. During treatment in the machine the material rises freely between the partitions but is kept back by them and prevented from being thrown toward the outlet prematurely.

A further advantage of the machine according to my invention is that, owing to the trough being open at the top, more material can be worked in a machine of the same dimensions than was possible with the older construction.

Having now particularly described and ascertained the nature of my said invention and in what manner the same is to be performed, I declare that what I claim is:

1. A kneading or grinding machine comprising an open trough, one or two shafts adapted to rotate in said trough and provided with kneading or grinding elements, an upward extension on said trough and partition gates or sluices in said extension reaching downward between said kneading or grinding elements and means for rotating said shafts.

2. A kneading or grinding machine comprising an open kneading trough, an outlet at one end of said trough, one or two shafts adapted to rotate in the trough and provided with kneading or grinding elements, an upward extension on said trough and partition gates adjustable in vertical guiding slots in said extension, said gates reaching downward between said kneading or grinding elements and means for rotating said shafts.

3. A kneading or grinding machine comprising an open kneading trough, an outlet at one end of said trough, one or two shafts adapted to rotate in the trough and provided with kneading or grinding elements, an upward extension on said trough, partition gates vertically adjustable in two or more adjacent vertical slots in said extension and reaching downward between said kneading or grinding elements and means for rotating said shafts.

4. A kneading or grinding machine comprising a trough, one or more shafts adapted to rotate in said trough and provided with kneading or grinding elements, an upward extension on said trough, a vertically adjustable partition gate in said extension reaching downwardly between the kneading or grinding elements, means for adjusting said gate laterally, and means for driving said shafts.

5. A kneading or grinding machine comprising a trough, a pair of shafts adapted to rotate in said trough and provided with overlapping kneading or grinding elements, an upward extension on said trough, a partition in said trough partially surrounding one of said shafts adjacent to the kneading or grinding element on the other shaft, an adjustable gate in said extension coöperating with said partition, and means for driving said shafts.

In witness whereof I have hereunto set my hand in presence of two witnesses.

CASIMIR WURSTER.

Witnesses:
HENRY HASPER,
WOLDEMAR HAUPT.